United States Patent [19]

Dunbar

[11] Patent Number: 4,911,973
[45] Date of Patent: Mar. 27, 1990

[54] REINFORCEMENT BLANKET FORMED BY SEWING TOGETHER LAYERS OF FIBER-REINFORCEMENT MATERIALS

[75] Inventor: Sidney G. Dunbar, Granville, Ohio

[73] Assignee: Owens-Corning Fiberglas Corporation, Toledo, Ohio

[21] Appl. No.: 167,761

[22] Filed: Mar. 14, 1988

[51] Int. Cl.$^4$ .................. B32B 7/08; D04H 3/10; D04H 13/00

[52] U.S. Cl. ................... 428/102; 112/412; 112/415; 112/417; 112/420; 112/440; 264/257; 264/258; 264/324; 428/104; 428/174; 428/285; 428/286; 428/287; 428/294; 428/542.8

[58] Field of Search ............... 428/102, 542.8; 112/412, 415, 417, 420, 440

[56] References Cited

U.S. PATENT DOCUMENTS

| | | | |
|---|---|---|---|
| 3,044,146 | 7/1962 | Thomas et al. | 428/102 |
| 3,614,936 | 10/1971 | Philipps | 112/420 |
| 3,649,428 | 3/1972 | Hughes | 428/102 |
| 3,761,345 | 9/1973 | Smith | 112/415 |
| 4,514,455 | 4/1985 | Hwang | 428/102 |
| 4,675,226 | 6/1987 | Ott | 428/102 |

*Primary Examiner*—James C. Cannon
*Attorney, Agent, or Firm*—Patrick P. Pacella; Catherine B. Martineau

[57] ABSTRACT

According to this invention, there is provided a reinforcement blanket having a plurality of layers of fiber-reinforcement materials sewn together. The sewing together of the various layers of the fiber-reinforcement materials provides a plurality of channels extending through the reinforcement blanket. The reinforcement blanket can be shaped into a preform or can be used directly as a reinforcement in a molding process. The channels in the reinforcement blanket aid in distributing a matrix resin during an impregnation process.

4 Claims, 2 Drawing Sheets

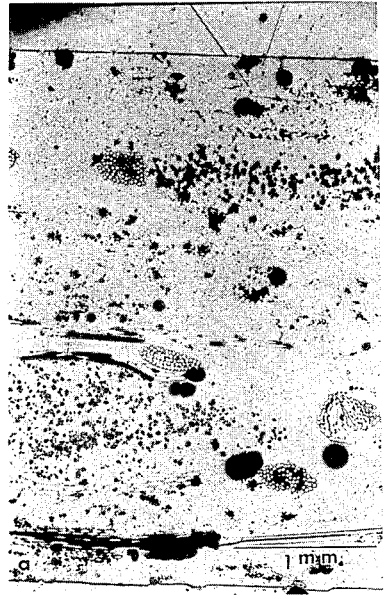
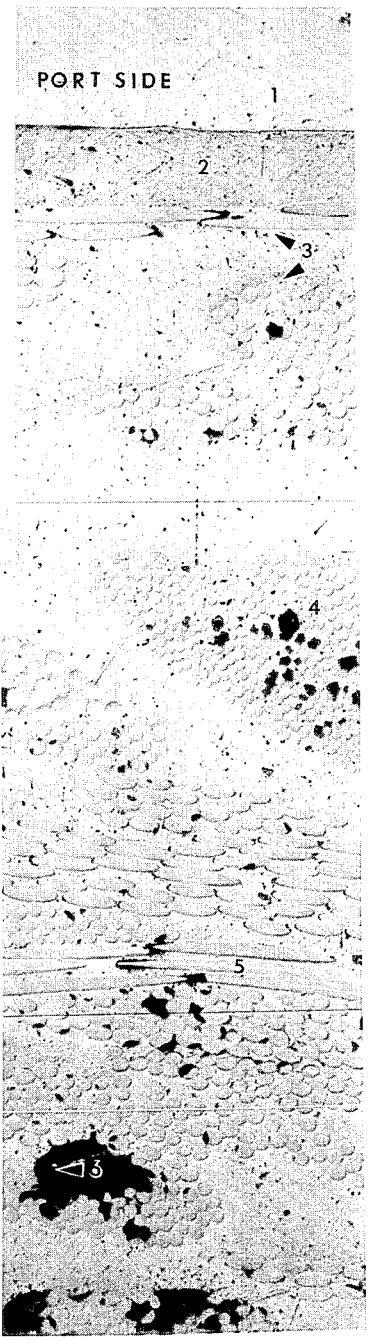
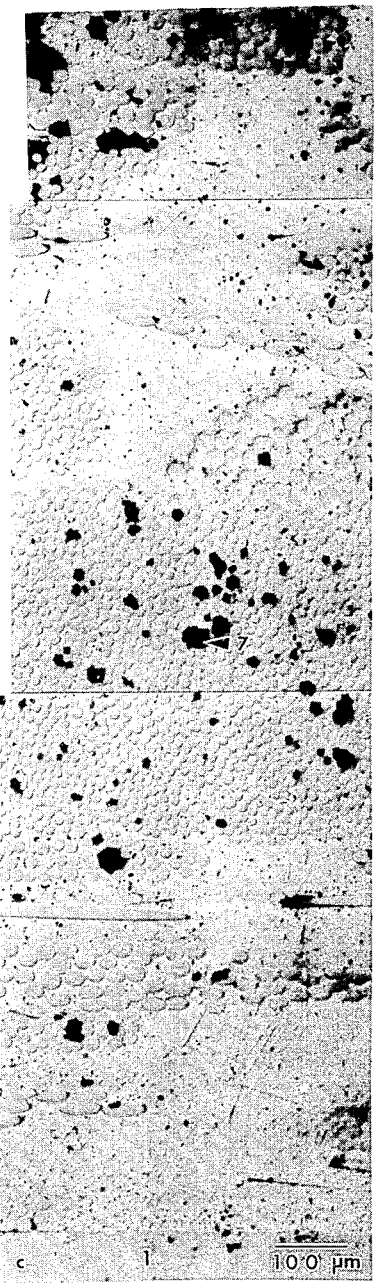
FIG. 1
FIG. 2
FIG. 3

REINFORCEMENT BLANKET FORMED BY SEWING TOGETHER LAYERS OF FIBER-REINFORCEMENT MATERIALS

BACKGROUND OF THE INVENTION

This invention pertains to reinforcement blanket useful for making fiber-reinforced articles.

As one of its more specific aspects, this invention pertains to a reinforcement blanket which comprises various combinations of layers of random preformable or standard continuous strand mat and layers of unidirectional or multidirectional reinforcement material placed in a predetermined specified sequence and sewn together for ease in handling as a single blanket unit. In one embodiment the reinforcement blanket is preformed to a desired shape for use in molding various structural applications such as large, complex automotive shapes.

The production of glass fiber-reinforced materials into useful shapes is well-known. Normally, a glass reinforced fibrous mat is preformed and then placed in a mold for molding into a fiber-reinforced article. Typically, glass fiber-reinforcement mats are used in situations where a desired strength is necessary, such as in automobile bumpers. For example, layers of the continuous strand mat and layers of unidirectional or multidirectional reinforcement material are fabricated separately. These layers are individually placed in a set of preform screens which generally consist of an upper screen and a lower screen. The upper and lower screens are moved together in order to conform the layers to the shape of the preform screens. The layers are thus shaped into what is known as a preform. The preform is then placed in a mold and injected with a suitable resinous material to make the fiber-reinforced article. However, problems occur in the production of the glass fiber-reinforced articles when layers of the unidirectional or multidirectional reinforcement material are layered adjacent each other when making the preform. Often the adjacent layers of the unidirectional or multidirectional material move relative to one another and delamination sometimes occurs during the preforming process and subsequent handling of the preform.

Further, the production of the fiber-reinforced articles is a time-consuming process since the manufacture of the fiber-reinforced articles includes at least two time-consuming steps: first, the each individual layer of continuous strand mat and unidirectional or multidirectional reinforcement material must be individually placed in the preform screen in order to form a preform; and second, the preform is thereafter placed in a mold and impregnated with a matrix resin and cured to form the final article.

It would be beneficial if various combinations of different fibrous reinforcement materials could easily be fabricated into reinforcement blankets which could then be easily shaped into the final preform for molding into a product or articles.

Further, it would be beneficial if glass fiber-reinforced articles could be made without compromising the integrity of the preform due to delamination of the fiber-reinforcement mat during the preform shaping process and subsequent handling of the preform.

SUMMARY OF THE INVENTION

According to this invention, there is provided a reinforcement blanket having a plurality of layers of fiber-reinforcement materials sewn together for ease in handling of the reinforcement blankets.

According to another aspect of this invention, the sewing together of the various layers of the fiber-reinforcement materials provides a plurality of channels extending through the reinforcement blanket. The reinforcement blanket is impregnated with a suitable resin material during the molding process. The channels aid in distributing the resin throughout the layers of the fiber-reinforced materials during the impregnation process.

Also, according to this invention, there is provided a preform which comprises a reinforcement blanket having sewn together layers of fiber-reinforcement materials. The preform is easy to handle and substantially resistant to delamination during molding or other further processing operations.

BRIEF DESCRIPTION OF THE DRAWINGS

FIG. 1 is a series of microphotographs of a sample of a prior art impregnated reinforcement blanket.

FIG. 2 is a series of microphotographs of a sample of a prior art impregnated reinforcement blanket.

FIG. 3 is a series of microphotographs of a sample of a prior art impregnated reinforcement blanket.

DETAILED DESCRIPTION OF THE INVENTION

Figure 4:
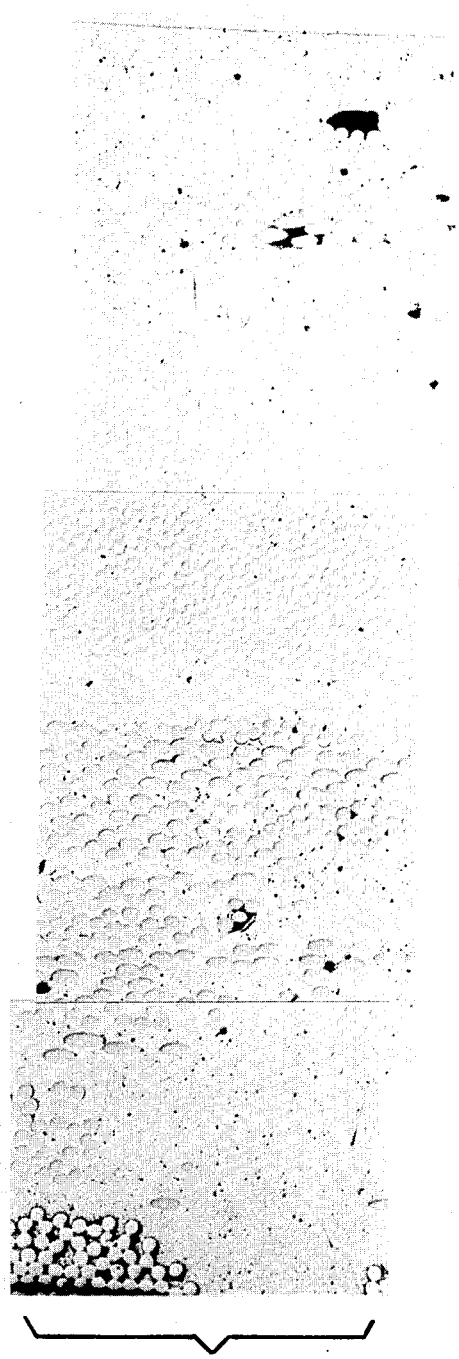
FIG. 4 is a series of microphotographs of a sample of an impregnated reinforcement blanket of the present invention.

The present invention relates to reinforcement blankets composed of layers of continuous strand mat and unidirectional or multidirectional reinforcement materials sewn together to form a single reinforcement blanket unit. Reinforcement blankets are used mainly in two molding processes: RTM (Resin Transfer Molding) and SRIM (Structural Resin Injection Molding). While these processes are two distinct molding processes, they share certain features such as using a preformed shape to be closed between two mold halves and then injecting a reactive resinous material to form useful articles such as automotive shapes. RTM uses static mixing to mix resin ingredients prior to impregnation, while SRIM uses impingement mixing.

The present invention is compatible with various different glass fiber-reinforcements. Any suitable unidirectional or multidirectional reinforcement materials can be employed. It is within the contemplated scope of this invention that such unidirectional or multidirectional reinforcement material include, but not be limited to, such materials as, for example, chopped strand mat, knitted rovings or woven rovings, aramid reinforcements or carbon reinforcements. Unidirectional knitted rovings are normally comprised of E-glass rovings, (such as rovings of 300 yield [300 yards/pound], for example, rovings known as P30 from the Owens-Corning Fiberglas Corporation) at a spacing of 6.5 ends per inch laid down in a parallel fashion and then bonded by knitting a polyester thread to each of the parallel rovings. Other glass yields may be used, such as 450 and 675, but not limited to these yields. Bidirectional knitted roving material is constructed by a precision knitting process. The warp and weft reinforcements are locked by a knit stitch, untwisted and uncrimped, into a stable fabric form. Rovings of a yield of, but not limited to 450 and 675 are generally used.

Any suitable continuous strand mat can be employed. Continuous strand mat is comprised of a plurality of glass fiber strands deposited in a random manner on a moving conveyor as is well-known in the art. Mat weight is generally 1.5 ounce/square foot but can vary from 0.75 ounce/square foot to 3.0 ounce/square foot or heavier. The mat is sized with chemical materials selected to be compatible with the matrix resin. The glass fiber strands are bonded together to form a mat with a suitable thermosetting resin or, in the case of a preformable continuous strand mat, bonded with a suitable binder material which has thermoplastic qualities. The composition of the thermosetting resins and the binder materials are well-known to those skilled in the art.

In one embodiment of the present invention a continuous strand mat and a unidirectional reinforcement material such as a Cofab ® parallel unidirectional knitted rovings material from the BW Industrial Group Company are layered together in a specific configuration. For example, alternative layers of the continuous strand mat and the Cofab ® unidirectional reinforcement material are layered in a specific configuration to form a glass fiber reinforcement for an automobile bumper. In particular, a specific configuration of: preformable continuous strand mat, unidirectional knitted rovings material, preformable continuous strand mat, preformable continuous strand mat, unidirectional knitted rovings material, unidirectional knitted rovings material, and preformable continuous strand mat have been sewn together according to the present invention placed together in a preform shape, and molded to produce automobile bumpers which pass the U.S. government 5 mph crash test.

Other structural shapes can be molded from preforms made from reinforcement blankets containing differing reinforcements. It is contemplated that various numbers of layers may be used and varying arrangements of layers may be used. For example, preforms comprised of continuous strand mats (designated as "X") and Cofab ® unidirectional knitted rovings material (designated as "O") are within the scope of the claimed invention (A) XOX, (B) XOOX, (C) XOXXOOX, (D) XOOXOOX, (E) XOXOXOX, (F) XXOOOXX, (G) XOOOOOX, (H) OXOXOXO, (I) XXXOOOX, or other configurations may also be considered to be within the contemplated scope of the claimed invention.

In the practice of the present invention the various layers of the fiber-reinforcement material comprising the reinforcement blanket are sewn together. While it is contemplated that, for example, seven various layers may be sewn together to from the blanket, a configuration of three layers can be sewn together and a configuration of four layers sewn together. These sewn together configurations can then be placed in a preform mold.

A conventional sewing machine, for example a Malimo ® stitch bonding sewing machine, having hundreds of needles can be used to sew the layers of continuous strand mat and unidirectional or multidirectional reinforcement material together. It is contemplated that various types of threads such as organic polyester fiber, nylon or cotton can be used to sew the layers together. Row spacing of the stitches can range from 10 per inch to one per 5 inches, and the number of stitches per inch can vary from 15 to 3. The individual layers are placed in the desired sequence, such as, for example, XOX, XOOX, or XOXXOOX, and then fed into the sewing machine. The layers are sewn together to form the reinforcement blanket. After sewing, the multiple ply reinforcement blanket can be rolled up as a single unit into a roll form.

When the various layers are sewn together the needles of the sewing machine cause a plurality of holes or channels to extend through the reinforcement blanket. When the reinforcement blanket is impregnated with a suitable matrix resin material during the molding process, the matrix resin material flows into the channels in the blanket. The channels in the reinforcement blanket aid in distributing the resin throughout the blanket.

Any suitable resin can be employed in the impregnation of the reinforcement blanket. Resins used in the RTM process include styrene-based polyester and vinyl ester resins; however, epoxy, Bis-maleimide, and other hybrid resins can also be employed. Resins used in the SRIM process normally include polyesters, urethanes, epoxies, nylons, acrylics, or combinations of the above, and any other reactive system can be employed.

Referring now to FIGS. 1-3, the use of various layers of continuous strand mat and unidirectional or multidirectional reinforcement materials have been used in the past to make preforms, such uses had in common the fact that each of the various layers of material required individual handling. Each layer was individually placed in a preform screen in order to form a preform. The preform was then impregnated with suitable matrix resin materials in order to make a laminated article. One configuration in particular, comprised of "X"-preformable continuous strand mat and "O" unidirectional knitted rovings material layered in the following sequence XOXXOOX, was molded to make ⅛ inch laminates. The layers were individually placed into a mold, impregnated with a matrix resin and molded. The impregnation results are shown in FIGS. 1-3. The FIGS. 1-3 are a series of microphotographs taken of polished cross sections cut through samples of the above described, non-sewn resin impregnated reinforcement blanket. The plane of polishing is perpendicular to the unidirectional knitted rovings fiber direction. Referring now in particular to FIGS. 2 and 3, the numbered portions of the sample are: (1) embedding medium which was used to afix the sample for purposes of obtaining the polished cross-sectional samples, (2) matrix resin, (3) random continuous strand mat, (4) unidirectional knitted rovings material, (5) organic fiber threads, (6) voids within the matrix resin, and, as shown in FIG. 3, (7) voids within bundles of the unidirectional knitted rovings material. Referring now to FIG. 1, Section a) shows the XOXXOOX reinforcement blanket configuration molded by one company and Section b) shows the same XOXXOOX reinforcement blanket configuration molded by a different company. The black areas seen in the photographs are voids in the resin due to impregnation difficulties. Referring now to FIG. 3, Section c) is a greatly expanded view of Section b) shown in FIG. 1. The photographs of FIG. 3 when placed in tandem, show the expanded view of the laminate shown in Section b) of FIG. 1. As can be seen by the prior art configuration shown in FIGS. 1-3, the individual placement of the various layers of continuous strand mat and unidirectional or multidirectional reinforcement material into the mold results in a final product having undesirable voids within the matrix resin and voids within the bundles of reinforcement materials.

Figure 5:
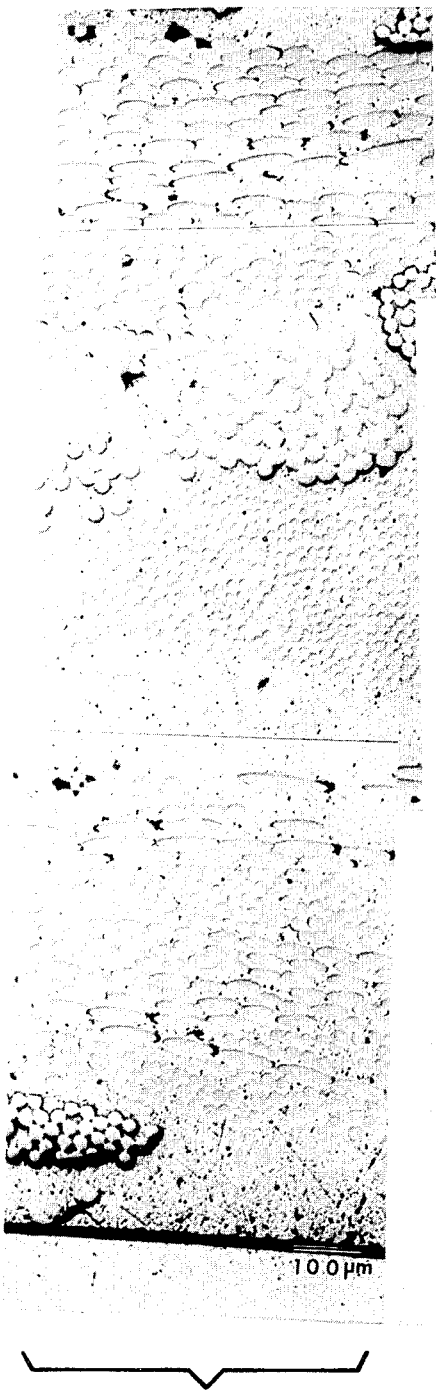
FIG. 5 is a series of microphotographs of a sample of an impregnated reinforcement blanket of the present invention.

Referring now to FIGS. 4-5, a reinforcement blanket made according to the present invention having the same configuration of blanket XOXXOOX was constructed by sewing together the layers having the configuration of: (1) XOX and (2) XOOX. The configurations XOX and XOOX were sewn together using an organic polyester fiber. Spacing of the stitched rows were approximately 5.5 per inch with approximately 7.5 stitches per inch. These sewn blankets were then placed in the same mold and a impregnated with a matrix resin in order to make a laminate. The impregnation results which are seen in FIGS. 4-5, show an improvement in impregnation of the layers with the matrix resin as can be seen by the greatly reduced number and size of voids within the sample.

The reinforcement blanket of the present invention containing layers of preformable continuous strand mat and unidirectional or multidirectional reinforcement material, when sewn together, provides a blanket which can be heated, pressed into a desired shape and then cooled to make a preform. It is easier to handle a single preformable blanket than it is to handle the individual layers of material when making preform shapes. When the reinforcement blanket is sewn together no delamination of the layers occurs since the threads hold the layers of the reinforcement blanket together.

Any suitable method may be used to form a preform made with a reinforcement blanket containing a unidirectional or multidirectional reinforcement material and a continuous strand mat. For example, preforms can be shaped from the reinforcement blanket which may contain various layers of differing reinforcements. The layers are sewn together and heated to make a preform. Upon cooling the blanket preform is held in the desired shape and is ready to be molded into a final article.

It is also within the contemplated scope of this invention that standard, or non-preformable, continuous strand mat can be utilized in forming a reinforcement blanket. The standard continuous strand mat comprises a plurality of glass fiber strands bonded together with a suitable thermosetting resin. The standard continuous strand mat can be sewn together with a unidirectional or multidirectional reinforcement material, as described above, to form a reinforcement blanket. Such reinforcement blanket, containing the standard continuous strand mat, can be placed in a mold, impregnated with a matrix resin and molded to form fiber reinforced articles. The sewing together of these layers provides ease of handling the mat during the various molding processes.

The present invention is useful with a number of processes which enable the fiber-reinforced preform to be made in a speedy and efficient manner. The technology used to make such preforms is known to those skilled in the art and does not constitute a part of this invention.

While reference has been made to the preferred embodiments of the present invention, those skilled in the art may recognize that various modifications may be made which modifications shall be accorded the broadest scope of the intended claims so as to encompass all equivalent reinforcement blankets and the like.

I claim:

1. A reinforcement blanket comprising a combination of layers of fiber-reinforcement materials, consisting of a first layer of continuous strand mat; a second layer of unidirectional knitted rovings reinforcement material; a third layer of continuous strand mat; a fourth layer of continuous strand mat; a fifth layer of unidirectional knitted rovings reinforcement material; a sixth layer of unidirectional knitted rovings reinforcement material; and, a seventh layer of continuous strand mat; sewn together with a thread material, the reinforcement blanket including a plurality of channels formed by the thread material extending through the continuous strand mat and the unidirectional knitted rovings reinforcement material.

2. The reinforcement blanket of claim 1, wherein the layers of fiber reinforcement materials sewn together have spacing of stitched rows between about ten rows per inch to about one row per five inches, and wherein the number of stitches per inch varies from about 15 to about 3.

3. The reinforcement blanket of claim 1 wherein the combination of the layers of the mat and unidirectional or multidirectional reinforcement material are sewn together as two pieces; the first piece comprising the first layer of continuous strand mat, the second layer of unidirectional or multidirectional reinforcement material, and the third layer of continuous strand mat; the second piece comprising the fourth layer of continuous strand mat, the fifth layer of unidirectional or multidirectional reinforcement material, the sixth layer of unidirectional or multidirectional reinforcement material, and the seventh layer of continuous strand mat.

4. A preform comprising the reinforcement blanket of claim 1 impregnated with a matrix resin, wherein such the matrix resin flows through the channels into the reinforcement blanket.

* * * * *